Patented Nov. 26, 1940

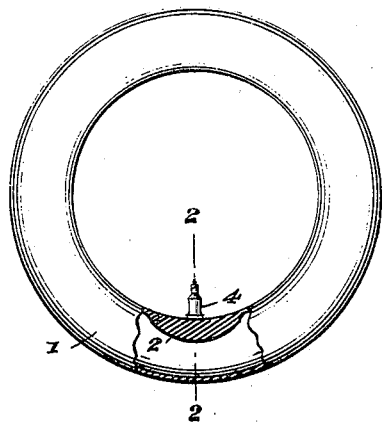
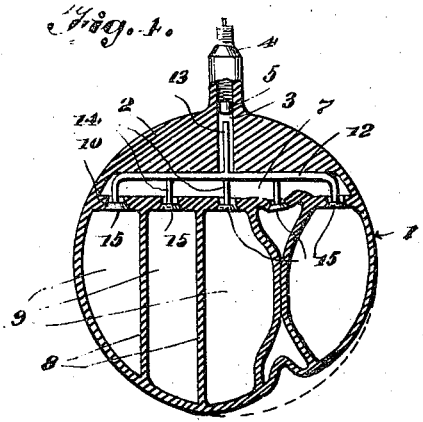

2,223,007

UNITED STATES PATENT OFFICE 2,223,007

SAFETY INNER TUBE OR TIRE

Harold Legowsky and Clifford Menzies, Detroit, Mich.

Application June 26, 1939, Serial No. 281,235

1 Claim. (Cl. 152—342)

This invention relates to a safety inner tube or tire.

An object of the invention is the construction of an inner tube or tire which will minimize the danger of injury as a result of blowouts or punctures, etc.

Another object of the invention is the construction of a novel and useful inner tube or tire which will increase the efficiency of a vehicle in running on a schedule, and which inner tube will also possess advantages that will give greater result under great strain, over the old type of an inner tube or tire.

It is to be understood that with our improved inner tube or tire, vehicles equipped with same will accomplish better results, when running on schedule, or in emergencies, such as in case of a fire apparatus, a police car, an ambulance, etc.

With the foregoing and other objects in view, the invention comprises certain novel constructions, combinations, and arangements of parts, as will be hereinafter fully described, illustrated in the accompanying drawing, and more particularly pointed out in the appended claim.

In the drawing:

Figure 1 is a view in side elevation, partly shown in longitudinal section, of an inflated inner tube or tire constructed in accordance with the present invention.

Figure 2 is an enlarged sectional view taken on line 2—2 of Fig. 1.

Figure 3 is an enlarged sectional view taken on line 3—3, Fig. 2, and looking in the direction of the arrows.

Figure 4 is an enlarged transverse sectional view, similar to Fig. 2, showing one of the annular compartments deflated, while Figure 4a is an enlarged fragmentary view of the disclosure in Fig. 4, showing particularly a portion of the deflated compartment.

Referring to the drawing, in which we have shown the preferred embodiment of our invention, 1 designates a casing, made in the usual manner, that is, of suitable rubber or rubber composition material. The casing 1 is provided with an inwardly extending reinforcing portion 2 in which is formed a radially extending passage 3. A standard valve 4 is connected to casing 1 at the reinforced portion 2, and this valve 4 communicates with the passage 3. The head 5, of valve 4, extends into passage 3.

The intermediate portion of the reinforcement 2 is formed with a transverse slot or pocket 7 having a flexible wall 6, and partitions 8 extend circumferentially in the casing and divide the casing into compartments 9 which communicate with the pocket 7 through passages 10 formed in the wall 6 and flared to provide valve seats. Therefore, the compartments 9 have individual communication with the pocket 7.

Within the pocket 7 is a valve unit 11. This valve unit 11 is bodily movable within pocket 7, for the purpose hereinafter described. The valve unit 11 comprises an elongated rod-like body 12 that is positioned transverse of casing 1 and extends longitudinally in the pocket. The elongated body or rod 12 is provided with an outwardly-extending integral extension 13, which extension is positioned in the passage 3, with the outer end of the extension close to the head 5 of valve 4, so that said head can press against extension 13 while the tire or tube is being inflated. The body 12 is provided at its ends, as well as intermediate its ends, with outwardly-extending short stems 14. On the outer end of each stem 14 is a head 15 and since the stems 14 enter passages 10, the heads may seat against the valve seats formed by the flared portions of the passages. The body 12, extension 13 and stems 14 are formed of hard rubber, whereas the heads 15 are formed of semi-hard rubber. By reason of this novel structure, the valve unit 11 has sufficient strength to efficiently operate, because the valve heads 15 will be held normally in their seated position, but in case of a puncture or deflation of any one compartment, the corresponding head (see Fig. 4a), by reason of its semi-hardness, will move or twist, to remain in an efficient seated position, thereby preventing any leakage of air from the pocket 7 into the deflated compartment of the casing. This movement is clearly shown, in Fig. 4a, by the full lines and the dotted lines. The twisting or turning of the rubber of the compartment acts to bind or more securely seat the valve head 15, together with the action of the body 12 and stem 14, in holding the head 15 in position.

When it is desired to deflate all of the compartments, it is only necessary to press in on the outer end of extension 13, sufficiently to unseat the valve heads 15, whereupon the air in the entire casing 1 can escape. During the inflation, of the casing, the supply tube is applied in the usual manner to the standard valve 4, whereupon head 5 of said valve will move inwardly and press sufficiently against extension 13 to bodily move the valve unit 11 enough to unseat the valve heads 15 and permit the desired amount of air to enter all of the compartments.

It is to be understood that if the compartments are inflated to say 35 lbs. pressure, and one of the compartments 9 is deflated, then only approximately 7 pounds is lost which would reduce the pressure in the tube or tire to about 28 lbs. As a consequence, the vehicle to which the tube or tire is attached can conveniently run without any danger of a serious accident.

By reason of the "floating" or bodily-movable structure of the valve unit 11, a very simple and efficient means is provided for controlling the escape of air from the compartments of our device, whereas the valve unit will easily permit the entrance of air to the compartments at the will of the operator.

While we have described the preferred embodiment of our invention and illustrated the same in the accompanying drawing, certain minor changes or alterations may appear to one skilled in the art to which this invention relates during the extensive manufacture of the same and we, therefore, reserve the right to make such alterations or changes as shall fairly fall within the scope of the appended claim.

What we claim is:

A device of the character described comprising an annular casing of yieldable material having an inwardly extending thickened portion at a point upon its inner periphery, an inflating valve extending outwardly from the thickened portion of said casing, flexible partitions extending circumferentially in said casing in transverse relation to the casing and dividing the casing into a plurality of separate compartments, the thickened portion of said casing being formed with a pocket extending transversely of the casing and having a flexible inner wall formed with openings communicating with individual compartments and formed with flexible valve seats, a passage leading from said pocket and aligned with the inflating valve, a valve unit in said pocket consisting of a rod extending longitudinally in the pocket and having an extension midway its length extending into said passage, and stems extending from said rod in spaced relation to each other longitudinally thereof into the openings of the flexible wall and provided with yieldable heads for seating against said flexible valve seats of the openings when moved outwardly to a closed position.

HAROLD LEGOWSKY.
CLIFFORD MENZIES.